US010560950B2

(12) United States Patent
Sun

(10) Patent No.: US 10,560,950 B2
(45) Date of Patent: Feb. 11, 2020

(54) USER EQUIPMENT SENDING SIGNAL DIRECTLY TO USER EQUIPMENT

(71) Applicant: Huawei Technologies Co., Ltd., Shenzhen (CN)

(72) Inventor: Weijun Sun, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 234 days.

(21) Appl. No.: 15/864,944

(22) Filed: Jan. 8, 2018

(65) Prior Publication Data

US 2018/0132251 A1  May 10, 2018

Related U.S. Application Data

(63) Continuation of application No. PCT/CN2015/085033, filed on Jul. 24, 2015.

(51) Int. Cl.
*H04W 4/00* (2018.01)
*H04W 72/08* (2009.01)
(Continued)

(52) U.S. Cl.
CPC ..... *H04W 72/082* (2013.01); *H04W 72/0446* (2013.01); *H04W 72/06* (2013.01);
(Continued)

(58) Field of Classification Search
None
See application file for complete search history.

(56) References Cited

U.S. PATENT DOCUMENTS

2008/0137634 A1  6/2008 Hassan et al.
2010/0240312 A1  9/2010 Peng et al.
(Continued)

FOREIGN PATENT DOCUMENTS

CN  102365897 A  2/2012
CN  104125647 A  10/2014
(Continued)

OTHER PUBLICATIONS

Zhang, et al., "LTE-Unlicensed: the Future of Spectrum Aggregation for Cellular Networks," Technical Report of Wireless Networking Group, vol. 22, No. 3, Jun. 1, 2015, 22 pages.
(Continued)

*Primary Examiner* — Phirin Sam
(74) *Attorney, Agent, or Firm* — Slater Matsil, LLP

(57) ABSTRACT

Embodiments provide a method for sending a signal by user equipment and user equipment. The method includes: within an obtained channel detection cycle, detecting a first interference strength within system bandwidth and a second interference strength on each sub-band within the system bandwidth; comparing the first interference strength with a first interference threshold; if the first interference strength is less than the first interference threshold, selecting, from the system bandwidth according to the second interference strength on each sub-band within the system bandwidth, N first sub-bands that receive relatively small interference; and sending a signal on the N first sub-bands. In consideration of interference within the entire bandwidth and interference to each sub-band, when interference to the entire system is relatively small, a transmission collision is avoided. In addition, selecting sub-bands that receive small interference for signal transmission further reduces transmission interference, thereby effectively improving data transmission reliability.

20 Claims, 5 Drawing Sheets

(51) Int. Cl.
  *H04W 72/06* (2009.01)
  *H04W 74/08* (2009.01)
  *H04W 72/04* (2009.01)
  *H04W 88/04* (2009.01)
  *H04W 92/18* (2009.01)

(52) U.S. Cl.
  CPC ....... *H04W 72/08* (2013.01); *H04W 74/0816* (2013.01); *H04W 72/0453* (2013.01); *H04W 74/0825* (2013.01); *H04W 88/04* (2013.01); *H04W 92/18* (2013.01)

(56) References Cited

U.S. PATENT DOCUMENTS

| | | | | |
|---|---|---|---|---|
| 2014/0056165 A1* | 2/2014 | Siomina | ............... | H04B 1/7083 370/252 |
| 2015/0201419 A1* | 7/2015 | Zhou | ................. | H04W 72/02 370/329 |
| 2015/0349939 A1 | 12/2015 | Wang | | |
| 2016/0100441 A1* | 4/2016 | Li | ............. | H04L 5/0057 370/329 |
| 2016/0248494 A1* | 8/2016 | Kneckt | ............. | H04W 74/0816 |
| 2016/0248550 A1* | 8/2016 | Sorrentino | ............... | H04L 1/08 |
| 2016/0345297 A1 | 11/2016 | Chen et al. | | |
| 2017/0019813 A1* | 1/2017 | Kim | ............. | H04W 24/08 |
| 2017/0126338 A1* | 5/2017 | Zaidi | .............. | H04W 8/005 |
| 2018/0338319 A1* | 11/2018 | Kim | ............. | H04W 76/14 |

FOREIGN PATENT DOCUMENTS

| | | |
|---|---|---|
| CN | 104796845 A | 7/2015 |
| WO | 2008025621 A1 | 3/2008 |
| WO | 2013134891 A1 | 9/2013 |

OTHER PUBLICATIONS

Nasipuri et al.,"Multichannel Csma with Signal Power-Based Channel Selection for Multihop Wireless Networks," IEEE, VTC 2000, Sep. 24-28, 2000, pp. 211-218.

* cited by examiner

USER EQUIPMENT SENDING SIGNAL DIRECTLY TO USER EQUIPMENT

PRIORITY CLAIM AND CROSS-REFERENCE

This application is a continuation of International Application No. PCT/CN2015/085033, filed on Jul. 24, 2015, which is hereby incorporated by reference in their entireties.

TECHNICAL FIELD

Embodiments of the present invention relate to communications technologies, and in particular, to methods and devices for sending a signal by user equipment directly to user equipment.

BACKGROUND

Device-to-device (D2D) communication means communication directly performed between devices, and is generally classified into D2D unicast communication and D2D broadcast/multicast communication. In a D2D unicast communications system, one device directly communicates only with another device. In a D2D broadcast/multicast communications system, one device sends a data packet of the device to multiple devices near the device.

Regardless of unicast or broadcast/multicast communication, when no base station or controller participates in allocation of D2D communication transmission resources, user equipment selects a D2D communication transmission resource for the user equipment itself. Different user equipment is prone to select a same time-frequency resource to send their respective D2D signals. However, there is mutual interference between these signals, and it is impossible for user equipment to perform both sending and receiving on one time-frequency resource. Therefore, when two devices select a same time-frequency resource to send D2D signals, the two devices cannot receive a D2D signal from each other. In addition, when sending a signal on a sub-band within system bandwidth, user equipment cannot receive a signal from another device on another sub-band within the system bandwidth at the same time. Therefore, when two devices send their respective D2D signals on different sub-bands within the system bandwidth at the same time, the two devices cannot receive a D2D signal from each other.

In conclusion, in D2D communication, because mutual interference is caused when different devices select a same resource to send D2D signals, or a device cannot receive a signal on another frequency band when sending a signal, a receiving failure or faulty receiving is caused in D2D transmission, resulting in low D2D communication reliability.

SUMMARY

Embodiments of the present invention provide methods and devices for sending a signal by user equipment and user equipment, so as to resolve the following problem: In D2D communication, because mutual interference is caused when different user equipment selects a same resource to send D2D signals, or a device cannot receive a signal on another frequency band when sending a signal, a receiving failure or faulty receiving is caused in D2D transmission, resulting in low D2D communication reliability.

A first aspect of embodiments of the present invention provides a method for sending a signal by user equipment, including determining, by user equipment, a channel detection cycle. The method further includes obtaining, by the user equipment within the channel detection cycle, a first interference strength within system bandwidth, and obtaining a second interference strength on each sub-band within the system bandwidth, where the first interference strength is a sum of interference strengths on all sub-bands within the system bandwidth. The method also includes comparing, by the user equipment, the first interference strength with a first interference threshold. The method includes that if the first interference strength is less than or equal to the first interference threshold, selecting, by the user equipment, N first sub-bands from the system bandwidth according to the second interference strength on each sub-band within the system bandwidth, and sending a signal on frequency resources corresponding to the N first sub-bands, where N is a positive integer, where a sum of second interference strengths on the N first sub-bands is less than or equal to a sum of second interference strengths corresponding to any N sub-bands other than the N first sub-bands within the system bandwidth.

With reference to the first aspect, in a first possible implementation of the first aspect, the method further includes, if the first interference strength is greater than the first interference threshold, determining, by the user equipment, whether transmission resource applying duration reaches preset maximum transmission resource applying duration. The method further includes, if the transmission resource applying duration is greater than or equal to the maximum duration, selecting, by the user equipment, M first sub-bands from the system bandwidth according to the second interference strength on each sub-band within the system bandwidth, and sending a signal on frequency resources corresponding to the M first sub-bands, where M is a positive integer, where a sum of second interference strengths on the M first sub-bands is less than or equal to a sum of second interference strengths corresponding to any M sub-bands other than the M first sub-bands within the system bandwidth.

With reference to the first aspect, in a second possible implementation of the first aspect, a second interference strength on each of the N first sub-bands is less than or equal to a second interference strength on any sub-band other than the N first sub-bands.

With reference to the first possible implementation of the first aspect, in a third possible implementation of the first aspect, a second interference strength on each of the M first sub-bands is less than or equal to a second interference strength on any sub-band other than the M first sub-bands.

With reference to any one of the first aspect, or the first to the third possible implementations of the first aspect, in a fourth possible implementation of the first aspect, the signal sent by the user equipment includes a channel reservation signal and/or a data signal, where the channel reservation signal is a signal used to indicate the sub-band selected by the user equipment within the system bandwidth, and the data signal includes data information of the user equipment.

With reference to the fourth possible implementation of the first aspect, in a fifth possible implementation of the first aspect, the signal sent by the user equipment includes a channel reservation signal and a data signal, and the sending a signal on frequency resources corresponding to the N first sub-bands includes, after the channel detection cycle ends, sending, by the user equipment, the channel reservation signal on the frequency resources corresponding to the N first sub-bands. The method further includes, after completion of sending the channel reservation signal, sending, by the user equipment, the data signal on the frequency resources corresponding to the N first sub-bands.

With reference to the fourth possible implementation of the first aspect, in a sixth possible implementation of the first aspect, the signal sent by the user equipment includes a channel reservation signal and a data signal, and the sending a signal on frequency resources corresponding to the M first sub-bands includes, after the channel detection cycle ends, sending, by the user equipment, the channel reservation signal on the frequency resources corresponding to the M first sub-bands. The method further includes, after completion of sending the channel reservation signal, sending, by the user equipment, the data signal on the frequency resources corresponding to the M first sub-bands.

With reference to any one of the first aspect, or the first to the sixth possible implementations of the first aspect, in a seventh possible implementation of the first aspect, the channel detection cycle includes at least one channel assessment (CCA) timeslot, and that the first interference strength is less than or equal to the first interference threshold includes: a first interference strength corresponding to each CCA timeslot within the channel detection cycle is less than or equal to the first interference threshold.

With reference to the first aspect or the second possible implementation of the first aspect, in an eighth possible implementation of the first aspect, the selecting, by the user equipment, N first sub-bands from the system bandwidth according to the second interference strength on each sub-band within the system bandwidth includes selecting, by the user equipment, N first sub-bands from the system bandwidth according to a size of a to-be-sent data packet and the second interference strength on each sub-band within the system bandwidth, or includes selecting, by the user equipment, N first sub-bands from the system bandwidth according to a preset quantity of sub-bands occupied by each data packet and the second interference strength on each sub-band within the system bandwidth.

With reference to the first possible implementation of the first aspect or the third possible implementation of the first aspect, in a ninth possible implementation of the first aspect, the selecting, by the user equipment, M first sub-bands from the system bandwidth according to the second interference strength on each sub-band within the system bandwidth includes selecting, by the user equipment, M first sub-bands from the system bandwidth according to a size of a to-be-sent data packet and the second interference strength on each sub-band within the system bandwidth, or includes selecting, by the user equipment, M first sub-bands from the system bandwidth according to a preset quantity of sub-bands occupied by each data packet and the second interference strength on each sub-band within the system bandwidth.

With reference to the eighth possible implementation of the first aspect, in a tenth possible implementation of the first aspect, the N first sub-bands are N frequency-contiguous sub-bands within the system bandwidth.

With reference to the ninth possible implementation of the first aspect, in an eleventh possible implementation of the first aspect, the M first sub-bands are M frequency-contiguous sub-bands within the system bandwidth.

A second aspect of embodiments of the present invention provides user equipment, including an obtaining module, configured to determine a channel detection cycle. The user equipment also includes a detection module, configured to: within the channel detection cycle, obtain a first interference strength within system bandwidth, and obtain a second interference strength on each sub-band within the system bandwidth, where the first interference strength is a sum of interference strengths on all sub-bands within the system bandwidth. The user equipment further includes a processing module, configured to compare the first interference strength with a first interference threshold, where, if the processing module learns, by means of comparison, that the first interference strength is less than or equal to the first interference threshold, the processing module is further configured to select N first sub-bands from the system bandwidth according to the second interference strength on each sub-band within the system bandwidth, where N is a positive integer, and a sum of second interference strengths on the N first sub-bands is less than or equal to a sum of second interference strengths corresponding to any N sub-bands other than the N first sub-bands. The user equipment also includes a sending module, configured to send a signal on frequency resources corresponding to the N first sub-bands.

With reference to the second aspect, in a first possible implementation of the second aspect, the processing module is further configured to, if the first interference strength is greater than the first interference threshold, determine whether transmission resource applying duration reaches preset maximum transmission resource applying duration. The processing module is further configured to, if the processing module determines that the transmission resource applying duration is greater than or equal to the maximum duration, select M first sub-bands from the system bandwidth according to the second interference strength on each sub-band within the system bandwidth, and send, by using the sending module, a signal on frequency resources corresponding to the M first sub-bands, where M is a positive integer, where a sum of second interference strengths on the M first sub-bands is less than or equal to a sum of second interference strengths corresponding to any M sub-bands other than the M first sub-bands within the system bandwidth.

With reference to the second aspect, in a second possible implementation of the second aspect, a second interference strength on each of the N first sub-bands selected by the processing module is less than or equal to a second interference strength on any sub-band other than the N first sub-bands.

With reference to the first possible implementation of the second aspect, in a third possible implementation of the second aspect, a second interference strength on each of the M first sub-bands selected by the processing module is less than or equal to a second interference strength on any sub-band other than the M first sub-bands.

With reference to the second aspect or the second possible implementation of the second aspect, in a fourth possible implementation of the second aspect, if the signal sent by the sending module includes a channel reservation signal and a data signal, the sending module is specifically configured to, after the channel detection cycle ends, send the channel reservation signal on the frequency resources corresponding to the N first sub-bands. The sending module is also configured to, after completion of sending the channel reservation signal, send the data signal on the frequency resources corresponding to the N first sub-bands. The channel reservation signal is a signal used to indicate the at least one first sub-band selected by the user equipment within the system bandwidth, and the data signal includes data information of the user equipment.

With reference to the first possible implementation of the second aspect or the third possible implementation of the second aspect, in a fifth possible implementation of the second aspect, if the signal sent by the sending module includes a channel reservation signal and a data signal, the sending module is specifically configured to, after the channel detection cycle ends, send the channel reservation signal on the frequency resources corresponding to the M first sub-bands. The sending module is also configured to, after completion of sending the channel reservation signal, send the data signal on the frequency resources corresponding to the M first sub-bands. The channel reservation signal is a signal used to indicate the at least one first sub-band selected by the user equipment within the system bandwidth, and the data signal includes data information of the user equipment.

With reference to any one of the second aspect, or the first to the fifth possible implementations of the second aspect, in a sixth possible implementation of the second aspect, the channel detection cycle includes at least one CCA timeslot, and that the processing module learns, by means of comparison, that the first interference strength is less than or equal to the first interference threshold includes: a first interference strength corresponding to each CCA timeslot within the channel detection cycle is less than or equal to the first interference threshold.

With reference to the second aspect or the first possible implementation of the second aspect, in a seventh possible implementation of the second aspect, the processing module is specifically configured to select N first sub-bands from the system bandwidth according to a size of a to-be-sent data packet and the second interference strength on each sub-band within the system bandwidth, or the processing module is configured to select N first sub-bands from the system bandwidth according to a preset quantity of sub-bands occupied by each data packet and the second interference strength on each sub-band within the system bandwidth.

With reference to the first possible implementation of the second aspect or the third possible implementation of the second aspect, in an eighth possible implementation of the second aspect, the processing module is specifically configured to select M first sub-bands from the system bandwidth according to a size of a to-be-sent data packet and the second interference strength on each sub-band within the system bandwidth, or the processing module is configured to select M first sub-bands from the system bandwidth according to a preset quantity of sub-bands occupied by each data packet and the second interference strength on each sub-band within the system bandwidth.

A third aspect of embodiments of the present invention provides user equipment, including: a processor and a transmitter, where the processor is configured to determine a channel detection cycle. The processor is also configured to, within the channel detection cycle, obtain a first interference strength within system bandwidth, and obtain a second interference strength on each sub-band within the system bandwidth, where the first interference strength is a sum of interference strengths on all sub-bands within the system bandwidth. The processor is further configured to compare the first interference strength with a first interference threshold. The processor is also configured to, if the processor learns, by means of comparison, that the first interference strength is less than or equal to the first interference threshold, select N first sub-bands from the system bandwidth according to the second interference strength on each sub-band within the system bandwidth, where N is a positive integer, and a sum of second interference strengths on the N first sub-bands is less than or equal to a sum of second interference strengths corresponding to any N sub-bands other than the N first sub-bands within the system bandwidth. The transmitter is configured to send a signal on frequency resources corresponding to the N first sub-bands.

According to the method for sending a signal by user equipment and the user equipment that are provided in embodiments of the present invention, within the obtained channel detection cycle, the user equipment detects the first interference strength within the system bandwidth and the second interference strength on each sub-band within the system bandwidth. The user equipment also compares the first interference strength with the first interference threshold, and if the first interference strength is less than the first interference threshold, selects, from the system bandwidth according to the second interference strength on each sub-band within the system bandwidth, the N first sub-bands that receive relatively small interference. The user equipment further sends the signal on the N first sub-bands. That is, in consideration of interference within the entire bandwidth and interference to each sub-band, if interference to the entire system is relatively small, it indicates that no nearby user equipment sends a signal. Therefore, a transmission collision is avoided, that is, nearby devices are prevented from transmitting a signal on different sub-bands at the same time. In addition, sub-bands that receive small interference are selected for signal transmission, that is, another device that causes interference to the sub-bands is at a relatively long distance. This further reduces transmission interference, thereby effectively improving data transmission reliability.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of embodiments of the present invention.

Figure 1:
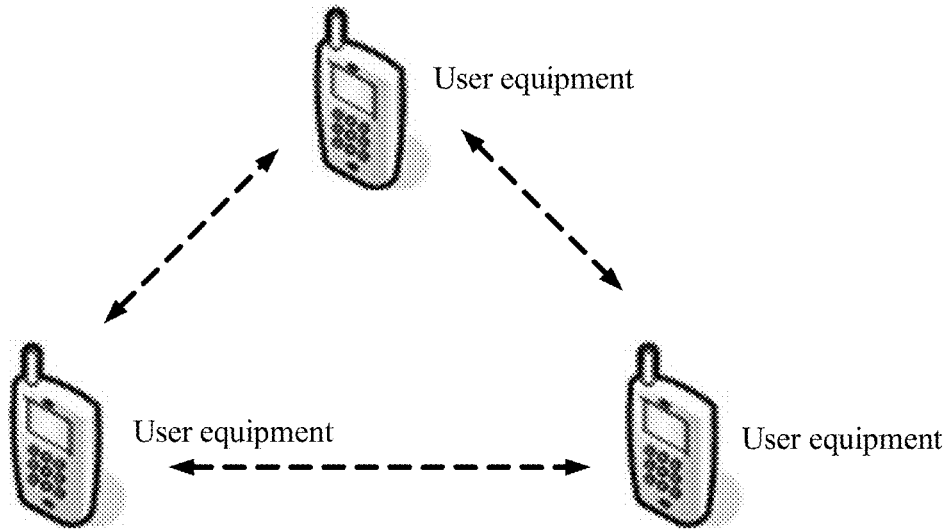
FIG. 1 is a schematic diagram of a communication scenario according to embodiments of the present invention.

FIG. 1 is a schematic diagram of a communication scenario according to embodiments of the present invention. Solutions in embodiments of the present invention may be applied to a device for sending a signal to another device or receiving a signal sent by another device. In the communication scenario, there are at least two devices. A device in embodiments of the present invention is a terminal device that can perform D2D communication or another wired or wireless communication, or may be another network device. The device in embodiments of the present invention is collectively referred to as user equipment in the following. As shown in FIG. 1, there are three mobile phones that can perform D2D communication. The device in embodiments of the present invention is not limited to a mobile phone, and may be a tablet computer, an intelligent terminal, a network device, or the like. This is not specifically limited.

Figure 2:
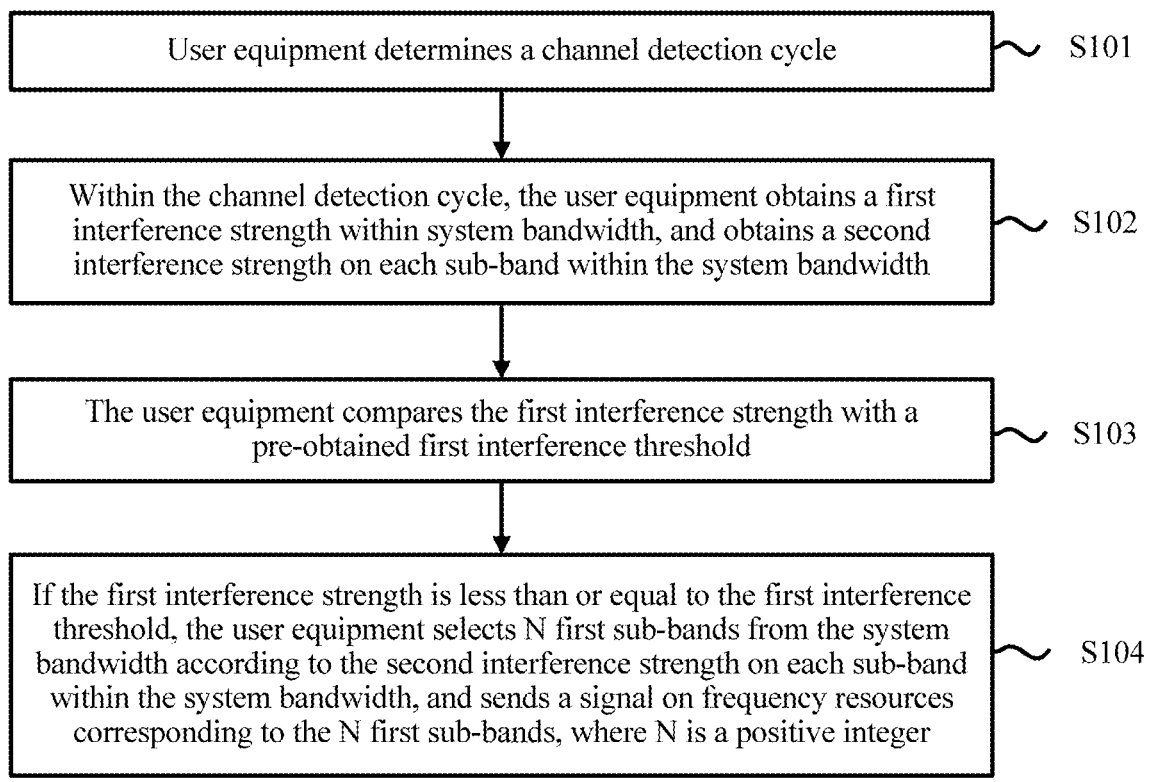
FIG. 2 is a flowchart of Embodiment 1 of a method for sending a signal by user equipment according to embodiments of the present invention.

FIG. 2 is a flowchart of Embodiment 1 of a method for sending a signal by user equipment according to embodiments of the present invention. As shown in FIG. 2, based on the communication scenario shown in FIG. 1, this solution is executed by user equipment. Before sending a signal, a device needs to select an appropriate sending resource, such as a time resource and a frequency resource. This solution mainly relates to a resource selection process and a sending process in D2D communication. The method for sending a signal by user equipment includes the following specific steps.

S101. The user equipment determines a channel detection cycle.

In this embodiment, the channel detection cycle may be preconfigured, or may be predefined in a protocol. The channel detection cycle indicates allowed maximum duration for detecting a channel. Specific duration may be selected at random, or a channel detection cycle may be selected according to a current service status (such as a priority of a data packet) and the like. For example, if a current data packet has a higher priority, the user equipment may select a relatively short channel detection cycle.

S102. Within the channel detection cycle, the user equipment obtains a first interference strength within system bandwidth, and obtains a second interference strength on each sub-band within the system bandwidth.

In this embodiment, after selecting the channel detection cycle, the user equipment detects an interference signal within the entire system bandwidth within the entire channel detection cycle, so as to obtain the first interference strength. The first interference strength is used to indicate a magnitude of the interference signal within the system bandwidth. The first interference strength may be a sum of interference signal strengths of all sampling points within the system bandwidth within the channel detection cycle, or may be an average value of interference signal strengths of all sampling points within the system bandwidth within the channel detection cycle. Generally, an interference signal strength may be a power of an interference signal, or may be an amplitude of an interference signal, provided that the interference signal strength can indicate a magnitude of interference. This is not specifically limited.

The system bandwidth may be uplink bandwidth or downlink bandwidth in a frequency division duplex (FDD) system, or bandwidth in a time division duplex (TDD) system.

The channel detection cycle includes at least one CCA timeslot. Therefore, sampling is performed in each CCA timeslot within the channel detection cycle, and an average value or a sum of powers of interference signals at all sampling points is used as the first interference strength.

Interference to each sub-band within the system bandwidth is detected, that is, the second interference strength is detected. A manner of obtaining the second interference strength on each sub-band is: performing frequency domain transformation on a received signal, measuring a power of each subcarrier signal on the sub-band, and using a sum of powers of all subcarrier signals on the sub-band as an interference strength on the sub-band.

S103. The user equipment compares the first interference strength with a pre-obtained first interference threshold.

In this embodiment, the user equipment may pre-configure or agree, in a protocol, the first interference threshold for an interference signal strength. If the obtained first interference strength is a sum of interference signal strengths, the first interference threshold needs to be set according to a sum of interference signal strengths within the system bandwidth. If the first interference strength is an average value of interference signal strengths, the first interference threshold is set according to an average value of interference signal strengths. In fact, alternatively, the first interference threshold may be determined by a device according to a channel use status. For example, if a current channel is relatively busy, a relatively low interference threshold may be selected. This may increase a difficulty in obtaining a sending resource by user equipment while reducing mutual interference caused by signal sending by multiple devices. Alternatively, the first interference threshold may be determined according to a service characteristic of a to-be-sent data packet. For example, a relatively high interference threshold may be used for data packets sensitive to a transmission delay. In this way, a transmission resource can be quickly obtained for these data packets.

S104. If the first interference strength is less than or equal to the first interference threshold, the user equipment selects N first sub-bands from the system bandwidth according to the second interference strength on each sub-band within the system bandwidth, and sends a signal on frequency resources corresponding to the N first sub-bands, where N is a positive integer.

In this embodiment, the channel detection cycle includes multiple CCA timeslots. Therefore, that the first interference strength is less than or equal to the first interference threshold preferably indicates: A first interference strength corresponding to each CCA timeslot within the channel detection cycle is less than or equal to the interference threshold.

If it is detected that the first interference strength on a channel is less than the interference threshold, it means that a relatively small quantity of signals are transmitted on a current channel or interference caused by another signal is relatively small. To further ensure reliability of a transmitted D2D signal, one or more (N) first sub-bands that receive relatively small interference need to be selected from the channel according to the second interference strength on each sub-band, for transmission. A sum of second interference strengths on the selected N first sub-bands is less than or equal to a sum of second interference strengths corresponding to any N sub-bands other than the N first sub-bands within the system bandwidth, where the device is allowed to use the any N sub-bands.

Specifically, at least the following two cases are included: In the selected N first sub-bands, a second interference strength corresponding to each first sub-band is less than or equal to a second interference strength on any sub-band other than the N first sub-bands.

Alternatively, the N first sub-bands are contiguous, and the sum of the second interference strengths on the N first sub-bands is less than a sum of second interference strengths on any other N sub-bands that the device is allowed to use within the system bandwidth. In conclusion, a purport is to select, from a channel, sub-bands that receive relatively small interference for signal sending.

According to the method for sending a signal by a device provided in this embodiment, within the preset channel detection cycle, the first interference strength with the system bandwidth and the second interference strength on each sub-band within the system bandwidth are detected; the first interference strength is compared with the first interference threshold; and if the first interference strength is less than the first interference threshold, the N first sub-bands that receive relatively small interference are selected from the system bandwidth according to the second interference strength on each sub-band within the system bandwidth, for signal sending. Sending a signal when interference to the entire system is relatively small, and therefore, a transmission collision is avoided, that is, nearby devices are prevented from transmitting a signal on a same sub-band at the same time. In addition, sub-bands that receive small interference are selected for signal transmission, that is, another device that causes interference to the selected sub-bands is at a relatively long distance. This further reduces transmission interference, thereby effectively improving data transmission reliability.

Figure 3:
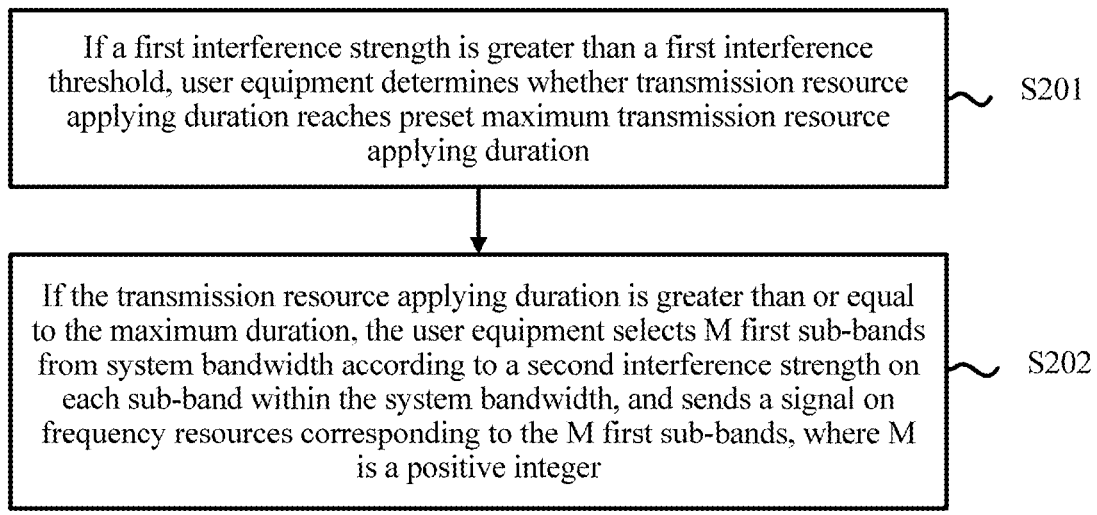
FIG. 3 is a flowchart of Embodiment 2 of a method for sending a signal by user equipment according to embodiments of the present invention.

FIG. 3 is a flowchart of Embodiment 2 of a method for sending a signal by user equipment according to embodiments of the present invention. As shown in FIG. 3, based on the embodiment shown in FIG. 2, after the second interference strength on each sub-band within the system bandwidth is detected, the method for sending a signal by user equipment further includes the following steps.

S201. If the first interference strength is greater than the first interference threshold, the user equipment determines whether transmission resource applying duration reaches preset maximum transmission resource applying duration.

In this embodiment, "reaches" described herein indicates being equal to or greater than, that is, it is required to determine whether the resource applying duration is equal to or greater than the preset maximum duration.

S202. If the transmission resource applying duration is greater than or equal to the maximum duration, the user equipment selects M first sub-bands from the system bandwidth according to the second interference strength on each sub-band within the system bandwidth, and sends a signal on frequency resources corresponding to the M first sub-bands, where M is a positive integer.

In this embodiment, when the first interference strength is greater than the interference threshold, the user equipment may wait and continue to perform detection in a next channel detection cycle. However, in specific implementation, generally, maximum transmission resource applying duration in a communication process is stipulated in a protocol, and it is impossible for the user equipment to wait endlessly. Therefore, in this case, it is required to determine whether transmission resource applying duration for applying for a transmission resource in current communication reaches protocol-stipulated or preset maximum transmission resource applying duration. If the transmission resource applying duration does not reach the allowed maximum duration, the user equipment may wait and continue to perform detection in a next channel detection cycle. If the transmission resource applying duration reaches the allowed maximum duration, or in a process of performing another step, it is detected that the transmission resource applying duration for applying for a transmission resource in the current communication reaches the maximum duration, the current communication needs to be performed. That is, the user equipment selects M first sub-bands from the system bandwidth according to the second interference strength on each sub-band within the bandwidth, for signal sending, and this manner is the same as that in Embodiment 1. A sum of second interference strengths on the M first sub-bands is less than or equal to a sum of second interference strengths corresponding to any M sub-bands other than the M first sub-bands within the system bandwidth.

A specific implementation of selecting M first sub-bands from the system bandwidth according to this embodiment is similar to a specific implementation of selecting N first sub-bands from the system bandwidth according to Embodiment 1. There are at least the following two implementations.

One implementation is: The user equipment (that is, a transmit side device) selects M (or N) first sub-bands from the system bandwidth according to a size of a to-be-sent data packet and the second interference strength on each sub-band within the system bandwidth.

The other implementation is: A device (that is, a transmit side device) selects M (or N) first sub-bands from the system bandwidth according to a preset quantity of sub-bands occupied by each data packet and the second interference strength on each sub-band within the system bandwidth.

For example, in a single carrier frequency division multiple access (SC-FDMA) system, N first sub-bands selected by a device may be N (N is a positive integer greater than or equal to 1) frequency-contiguous sub-bands, and interference to the selected N (N≥1) contiguous sub-bands is less than interference to any other N contiguous sub-bands that the device is allowed to use within the system bandwidth.

In an orthogonal frequency division multiple access (OFDMA) system, N sub-bands selected by a device may be N (N≥1) sub-bands that the device is allowed to use within the system bandwidth and that receive the smallest interference.

In the foregoing two embodiments, selecting a sub-band that receives relatively small interference for subsequent D2D signal transmission can ensure relatively small interference to subsequent D2D data transmission, so as to improve D2D data transmission reliability.

According to the method for sending a signal by a device provided in this embodiment, within the pre-obtained channel detection cycle, the first interference strength within the system bandwidth and the second interference strength on each sub-band within the system bandwidth are detected; and when the transmission resource applying duration reaches the maximum duration, the at least one first sub-band that receives relatively small interference is selected from the system bandwidth according to the second interference strength on each sub-band within the system bandwidth, for signal sending. Selecting a sub-band that receives small interference for signal transmission avoids interference caused by a signal of another nearby device to the sub-band selected by the user equipment, and reduces transmission interference, thereby effectively improving data transmission reliability.

Figure 4:
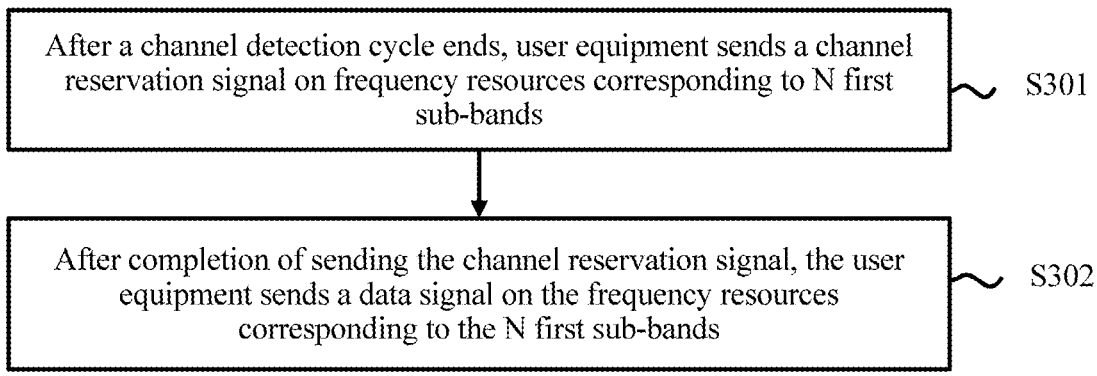
FIG. 4 is a flowchart of Embodiment 3 of a method for sending a signal by user equipment according to embodiments of the present invention.

FIG. 4 is a flowchart of Embodiment 3 of a method for sending a signal by user equipment according to embodiments of the present invention. As shown in FIG. 4, based on the embodiment shown in FIG. 2 or FIG. 3, the signal sent on the multiple selected first sub-bands includes a channel reservation signal and/or a data signal. The channel reservation signal is a signal used to indicate a first sub-band selected within the system bandwidth, and indicates at least a first sub-band selected by a terminal device within the system bandwidth and/or a sub-band occupied for data transmission by the terminal device. The data signal includes data information of the device, such as a data packet. In an example in which N first sub-bands are selected in Embodiment 1, specific steps of sending a signal on the N first sub-bands are as follows.

S301. After the channel detection cycle ends, the user equipment sends the channel reservation signal on the frequency resources corresponding to the N first sub-bands.

In this embodiment, the channel reservation signal includes one or more orthogonal frequency division multiplexing (OFDM) or SC-FDMA symbols. After the channel detection cycle ends, the channel reservation signal is transmitted only on the frequency resources corresponding to the first sub-bands selected by the device. A length of one OFDM symbol or one SC-FDMA symbol in the channel reservation signal may be equal to a length of one CCA timeslot. The channel reservation signal is sent after the channel detection cycle of the device ends, and the sending process continues until a system-configured or protocol-agreed moment. For example, the protocol-agreed moment may be an end moment of a third SC-FDMA symbol of a subframe.

S302. After completion of sending the channel reservation signal, the user equipment sends the data signal on the frequency resources corresponding to the N first sub-bands.

In this embodiment, after completion of sending the channel reservation signal of the user equipment, the user equipment continues to send the data signal of the user equipment on the sub-bands selected by the user equipment.

In the foregoing several embodiments, if the terminal device detects, within the channel detection cycle, that interference strengths within the entire system bandwidth are less than a threshold, or if the terminal device meets another signal sending condition, the terminal device sends the channel reservation signal and/or the data signal of the terminal device. The "another signal sending condition" may be that transmission resource applying duration corresponding to a data packet reaches a maximum value allowed by the system. Transmission resource applying duration of a data packet may be defined as duration from a moment at which a data packet starts to perform transmission resource applying or channel detection to a current moment. Alternatively, the "another signal sending condition" may be another configured condition complying with signal sending conditions. This is not specifically limited.

If the signal is a D2D signal, the D2D signal includes a D2D channel reservation signal and/or a D2D data signal. A manner of sending the D2D signal is similar to the foregoing manner. That is, after the channel detection cycle ends, the D2D channel reservation signal is sent on the selected first sub-bands, and then the D2D data signal is sent after completion of sending the D2D channel reservation signal.

Likewise, the sending a signal on frequency resources corresponding to the M first sub-bands in Embodiment 2 includes, after the channel detection cycle ends, sending, by the user equipment, the channel reservation signal on the frequency resources corresponding to the M first sub-bands; and after completion of sending the channel reservation signal, sending, by the user equipment, the data signal on the frequency resources corresponding to the M first sub-bands.

Preferably, the selected M first sub-bands are M frequency-contiguous sub-bands within the system bandwidth.

Based on the embodiments shown in FIG. 2 to FIG. 4, the following uses an example of D2D communication to describe a specific implementation process of a method for sending a signal by a device provided in embodiments of the present invention.

Figure 5:
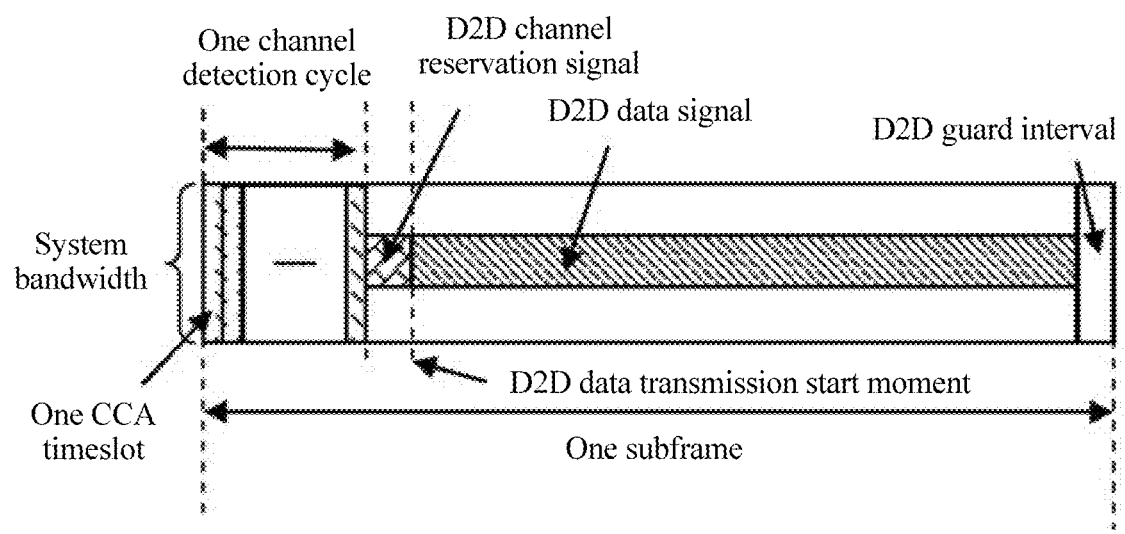
FIG. 5 is a schematic diagram of intra-subframe division in a method for sending a signal by user equipment according to embodiments of the present invention.

FIG. 5 is a schematic diagram of intra-subframe division in a method for sending a signal by user equipment according to embodiments of the present invention. As shown in FIG. 5, both D2D channel detection and D2D data transmission are completed in one subframe. The subframe may be a Long Term Evolution (LTE) subframe. At the beginning of a subframe, a terminal device selects a channel detection cycle and detects a first interference strength. If interference within system bandwidth within the entire channel detection cycle is lower than a threshold, or another D2D signal sending condition is met, the device selects first sub-bands that receive relatively small interference, and after the channel detection cycle ends, sends a D2D channel reservation signal and/or a D2D data signal on frequency resources corresponding to the sub-bands. In addition, a D2D guard interval is placed after the D2D data signal, so as to provide hardware conversion duration of the terminal device from transmitting to receiving or from receiving to sending.

Figure 6:
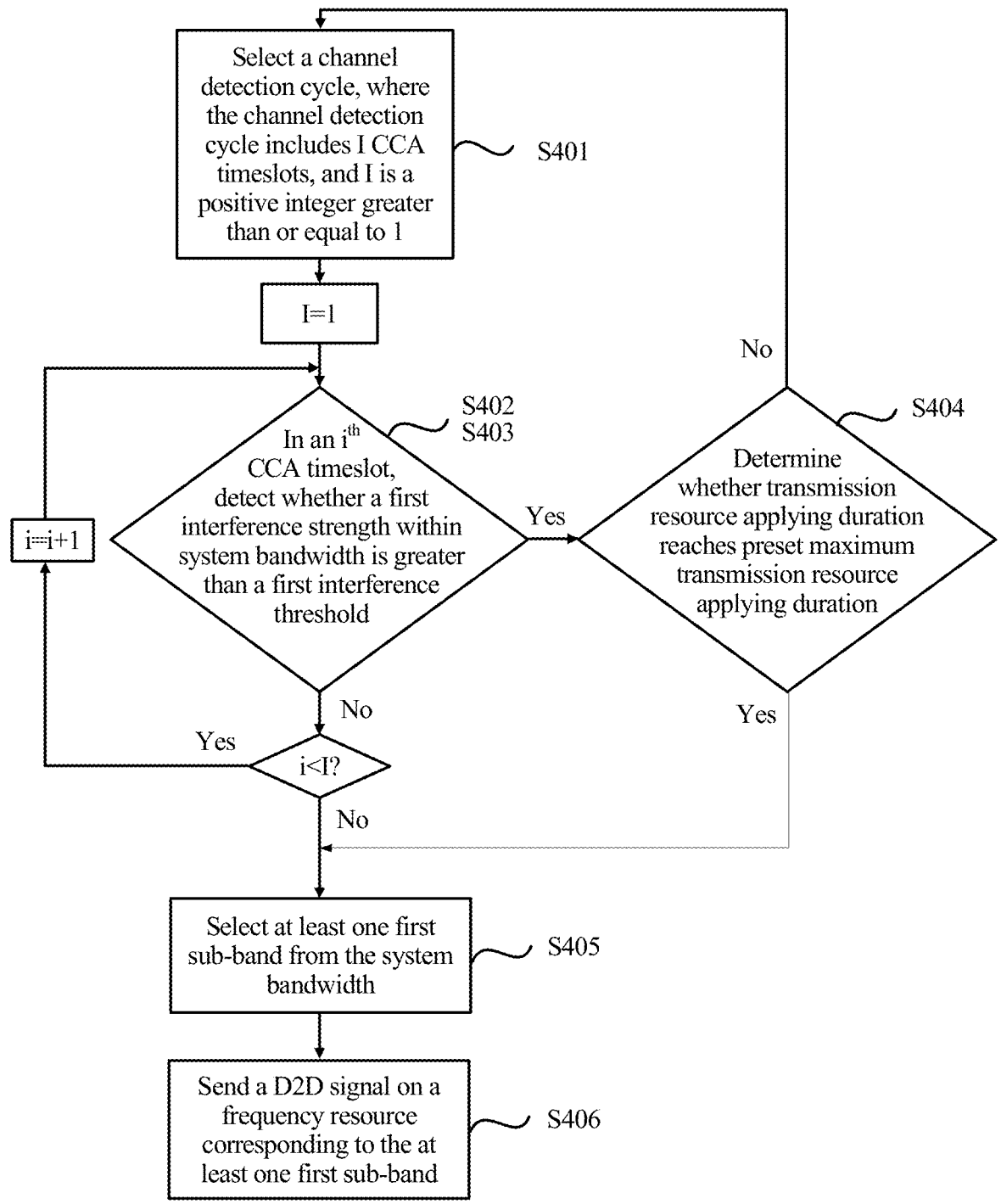
FIG. 6 is a schematic flowchart of an embodiment of a method for sending a signal by user equipment according to embodiments of the present invention.

FIG. 6 is a schematic flowchart of an embodiment of a method for sending a signal by a device according to embodiments of the present invention. As shown in FIG. 6, in actual application, specific steps of the method for sending a signal by a terminal device are as follows.

S401. Select a channel detection cycle, where the channel detection cycle includes I CCA timeslots, and I is a positive integer greater than or equal to 1.

In this embodiment, in the schematic diagram of subframe division shown in FIG. 5, a channel detection cycle selected from one subframe may include I (I≥1) CCA timeslots. A length of one CCA timeslot may be a few microseconds, such as nine microseconds. Allowed maximum duration of one channel detection cycle may be configured by a system or predefined in a protocol.

S402. In an ith CCA timeslot, detect whether a first interference strength within system bandwidth is greater than a first interference threshold.

If the first interference strength within the system bandwidth in the ith CCA timeslot is greater than the first interference threshold, step S403 is performed; otherwise, step S404 is performed. An initial value of i is 1. That is, interference signals within the system bandwidth are detected by means of sampling from the first CCA timeslot of a channel detection cycle. An average value or a sum of interference signal strengths is calculated and used as the first interference strength.

In this embodiment, before this, the first interference strength within the system bandwidth and a second interference strength on each sub-band within the system bandwidth need to be obtained by means of detection. The terminal device detects a magnitude of interference within the entire system bandwidth in each CCA timeslot of the selected channel detection cycle. A specific implementation is: accumulating powers of all sampling points in a CCA timeslot, averaging the accumulated powers to obtain an average power of the sampling points in the CCA timeslot, and using the average power as a first interference strength within the entire system bandwidth in the CCA timeslot.

The terminal device may compare the obtained first interference strength within the entire system bandwidth in one CCA timeslot with the interference threshold. The "interference threshold" may be configured by a system, agreed in a protocol, or determined by the device according to a service characteristic of a data packet. For example, a relatively low threshold may be used for a data packet sensitive to a transmission delay.

S403. In an (i=i+1)th CCA timeslot, detect whether a first interference strength within the system bandwidth is greater than the first interference threshold.

In this embodiment, this step is a cyclic step of step S402, and is repeatedly performed when a value of i is increased by 1. Therefore, a same description is used for S402 and S403 in the accompanying drawing. If the first interference strength within the system bandwidth in the (i+1)th CCA timeslot is less than the first interference threshold, this step is repeatedly performed, so as to perform detection in an (i+2)th CCA timeslot. When all first interference strengths in M CCA timeslots within the channel detection cycle are less than the first interference threshold, $S_{405}$ is performed. If a first interference strength in a CCA timeslot is greater than the first interference threshold, S404 is performed. In essence, S403 and S402 are same steps, but the value of i in S403 is increased by 1. For a specific procedure, refer to the accompanying drawing.

S404. Determine whether transmission resource applying duration reaches preset maximum transmission resource applying duration.

In this embodiment, if the transmission resource applying duration does not reach the stipulated maximum duration, detection continues to be performed in a next channel detection cycle according to the manners in steps S401 to S404. When the transmission resource applying duration reaches the stipulated maximum duration or first interference strengths in all CCA timeslots are less than the interference threshold, step S405 is performed.

S405. Select at least one first sub-band from the system bandwidth.

In this embodiment, the terminal device selects a first sub-band according to the second interference strength on each sub-band within the system bandwidth, and generally selects a sub-band that receives relatively small interference.

S406. Send a D2D signal on a frequency resource corresponding to the at least one first sub-band.

In this embodiment, the terminal device measures the second interference strength on each sub-band within the entire system bandwidth, and after the second interference strengths on the sub-bands are less than or equal to the interference threshold or another sending condition is met, the terminal device selects one or more first sub-bands according to a size of a data packet to be transmitted by the terminal device, or selects one or more first sub-bands according to a system-agreed quantity of sub-bands occupied by one data packet.

In an SC-FDMA system, sub-bands selected by a terminal device may be N (N≥1) frequency-contiguous sub-bands. A condition of selecting N (N is a positive integer greater than or equal to i) contiguous sub-bands is as follows: A sum of interference to the selected N (N≥1) contiguous sub-bands is less than a sum of interference to any other N contiguous sub-bands that the device is allowed to use within the system bandwidth. In an OFDMA system, sub-bands selected by a terminal device may be N (N≥1) sub-bands that receive the smallest interference. A method for obtaining a second interference strength on a sub-band is: performing frequency domain transformation on a received signal, measuring a power of each subcarrier signal on a corresponding sub-band, and using a sum of powers of all subcarrier signals on the sub-band as a second interference strength on the sub-band.

If the D2D signal includes a channel reservation signal and a D2D data signal, as shown in FIG. 5, during signal sending, after the channel detection cycle ends, the channel reservation signal is first sent, and the D2D data signal is sent after completion of sending the channel reservation signal. After completion of sending the data signal, a guard interval is reserved for hardware conversion.

According to the method for sending a signal by a device provided in this embodiment, a magnitude of interference within entire system bandwidth is measured; and when the interference within the entire system bandwidth is less than a threshold, D2D data signal transmission is performed. In this way, a disadvantage of a half-duplex mode can be overcome, that is, nearby devices are prevented from performing D2D data signal transmission on different sub-bands at the same time. Further, selecting sub-bands that receive relatively small interference and performing D2D data signal transmission on the sub-bands can reduce interference to D2D transmission, so as to improve D2D data transmission reliability.

In addition, a channel reservation signal is introduced in embodiments of the present invention to indicate a sub-band selected by a device and a sub-band occupied for subsequent data transmission by the device. This can help another device perform channel detection, and select a sub-band that receives relatively small interference for subsequent D2D data signal transmission. Therefore, interference to the subsequent D2D data transmission is relatively small, so as to more effectively improve D2D data transmission reliability.

Figure 7:
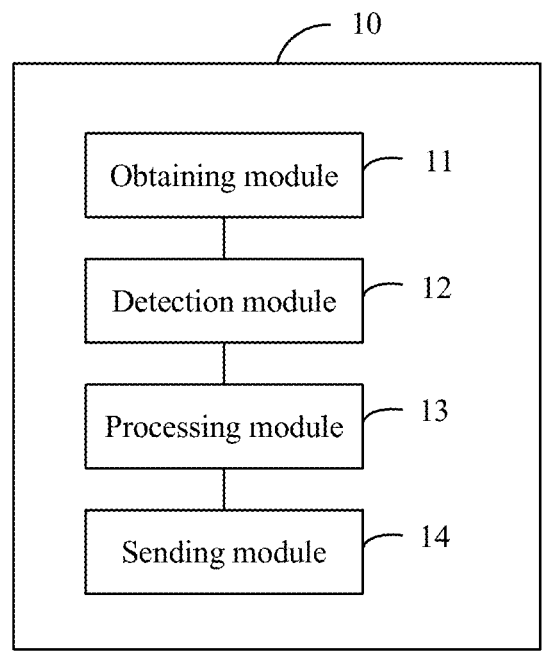
FIG. 7 is a schematic structural diagram of Embodiment 1 of user equipment according to embodiments of the present invention.

FIG. 7 is a schematic structural diagram of Embodiment 1 of user equipment according to embodiments of the present invention. As shown in FIG. 7, the user equipment 10 includes: an obtaining module 11, a detection module 12, a processing module 13, and a sending module 14.

The obtaining module 11 is configured to determine a channel detection cycle.

The detection module 12 is configured to: within the channel detection cycle, obtain a first interference strength within system bandwidth, and obtain a second interference strength on each sub-band within the system bandwidth, where the first interference strength is a sum of interference strengths on all sub-bands within the system bandwidth.

The processing module 13 is configured to compare the first interference strength with a first interference threshold.

If the processing module 13 learns, by means of comparison, that the first interference strength is less than or equal to the first interference threshold, the processing module 13 is further configured to select N first sub-bands from the system bandwidth according to the second interference strength on each sub-band within the system bandwidth, where N is a positive integer, and a sum of second interference strengths on the N first sub-bands is less than or equal to a sum of second interference strengths corresponding to any N sub-bands other than the N first sub-bands.

The sending module 14 is configured to send a signal on frequency resources corresponding to the N first sub-bands.

The user equipment provided in this embodiment is configured to execute the technical solutions in the method embodiment shown in any one of FIG. 1 to FIG. 6. An implementation principle and a technical effect of the user equipment are similar to those in the method embodiment. The interference signal within the system bandwidth is detected, and the first interference strength is obtained and compared with the specified first interference threshold; and when the first interference strength within the system bandwidth is less than the first interference threshold, that is, when the interference within the system bandwidth is relatively small and a device near the user equipment does not send a signal, the sub-band with a relatively small second interference strength is selected according to the second interference strength on each sub-band within the system bandwidth, for signal sending. Therefore, transmission interference is further reduced, so as to improve data transmission reliability.

In Embodiment 2 of user equipment in embodiments of the present invention, based on Embodiment 1, the processing module 13 is further configured to, if the first interference strength is greater than the first interference threshold, determine whether transmission resource applying duration reaches preset maximum transmission resource applying duration; and if the processing module 13 determines that the transmission resource applying duration is greater than or equal to the maximum duration, select M first sub-bands from the system bandwidth according to the second interference strength on each sub-band within the system bandwidth, and send, by using the sending module 14, a signal on frequency resources corresponding to the M first sub-bands, where M is a positive integer.

A sum of second interference strengths on the M first sub-bands is less than or equal to a sum of second interference strengths corresponding to any M sub-bands other than the M first sub-bands within the system bandwidth.

Optionally, a second interference strength on each of the N first sub-bands selected by the processing module 13 is less than or equal to a second interference strength on any sub-band other than the N first sub-bands.

Optionally, a second interference strength on each of the M first sub-bands selected by the processing module 13 is less than or equal to a second interference strength on any sub-band other than the M first sub-bands.

Optionally, if the signal sent by the sending module 14 includes a channel reservation signal and a data signal, the sending module 14 is specifically configured to, after the channel detection cycle ends, send the channel reservation signal on the frequency resources corresponding to the N first sub-bands; and after completion of sending the channel reservation signal, send the data signal on the frequency resources corresponding to the N first sub-bands. The channel reservation signal is a signal used to indicate the at least one first sub-band selected by the user equipment within the system bandwidth, and the data signal includes data information of the user equipment.

Optionally, if the signal sent by the sending module 14 includes a channel reservation signal and a data signal, the sending module 14 is specifically configured to, after the channel detection cycle ends, send the channel reservation signal on the frequency resources corresponding to the M first sub-bands; and after completion of sending the channel reservation signal, send the data signal on the frequency resources corresponding to the M first sub-bands. The channel reservation signal is a signal used to indicate the at least one first sub-band selected by the user equipment within the system bandwidth, and the data signal includes data information of the user equipment.

Optionally, the channel detection cycle includes at least one CCA timeslot, and that the processing module 13 learns, by means of comparison, that the first interference strength is less than or equal to the first interference threshold includes that a first interference strength corresponding to each CCA timeslot within the channel detection cycle is less than or equal to the first interference threshold.

Optionally, the processing module 13 is specifically configured to: select N first sub-bands from the system bandwidth according to a size of a to-be-sent data packet and the second interference strength on each sub-band within the system bandwidth; or select N first sub-bands from the system bandwidth according to a preset quantity of sub-bands occupied by each data packet and the second interference strength on each sub-band within the system bandwidth.

Optionally, the processing module 13 is specifically configured to: select M first sub-bands from the system bandwidth according to a size of a to-be-sent data packet and the second interference strength on each sub-band within the system bandwidth; or select M first sub-bands from the system bandwidth according to a preset quantity of sub-bands occupied by each data packet and the second interference strength on each sub-band within the system bandwidth.

The user equipment provided in this embodiment is configured to execute the technical solutions in the method embodiments shown in FIG. 1 to FIG. 6. An implementation principle and a technical effect of the user equipment are similar to those in the method embodiment, and details are not described herein again.

Figure 8:
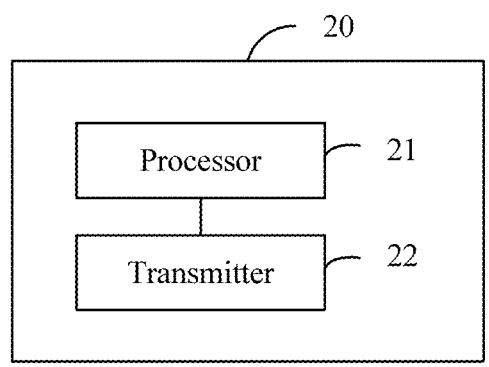
FIG. 8 is a schematic structural diagram of Embodiment 3 of user equipment according to embodiments of the present invention.

FIG. 8 is a schematic structural diagram of Embodiment 3 of user equipment according to embodiments of the present invention. As shown in FIG. 8, the user equipment 20 includes a processor 21 and a transmitter 22.

The processor 21 is configured to: determine a channel detection cycle; within the channel detection cycle, obtain a first interference strength within system bandwidth, and obtain a second interference strength on each sub-band within the system bandwidth, where the first interference strength is a sum of interference strengths on all sub-bands within the system bandwidth; and compare the first interference strength with a first interference threshold; and if the processor 21 learns, by means of comparison, that the first interference strength is less than or equal to the first interference threshold, select N first sub-bands from the system bandwidth according to the second interference strength on each sub-band within the system bandwidth, where N is a positive integer, and a sum of second interference strengths on the N first sub-bands is less than or equal to a sum of second interference strengths corresponding to any N sub-bands other than the N first sub-bands within the system bandwidth.

The transmitter 22 is configured to send a signal on frequency resources corresponding to the N first sub-bands.

In Embodiment 2 of user equipment in embodiments of the present invention, based on Embodiment 1, the processor 21 is further configured to, if the first interference strength is greater than the first interference threshold, determine whether transmission resource applying duration reaches preset maximum transmission resource applying duration; and if the processor 21 determines that the transmission resource applying duration is greater than or equal to the maximum duration, select M first sub-bands from the system bandwidth according to the second interference strength on each sub-band within the system bandwidth, and send, by using the transmitter 22, a signal on frequency resources corresponding to the M first sub-bands, where M is a positive integer. A sum of second interference strengths on the M first sub-bands is less than or equal to a sum of second interference strengths corresponding to any M sub-bands other than the M first sub-bands within the system bandwidth.

Optionally, a second interference strength on each of the N first sub-bands selected by the processor 21 is less than or equal to a second interference strength on any sub-band other than the N first sub-bands.

Optionally, a second interference strength on each of the M first sub-bands selected by the processor 21 is less than or equal to a second interference strength on any sub-band other than the M first sub-bands.

Optionally, if the signal sent by the transmitter 22 includes a channel reservation signal and a data signal, the transmitter 22 is specifically configured to: after the channel detection cycle ends, send the channel reservation signal on the frequency resources corresponding to the N first sub-bands; and after completion of sending the channel reservation signal, send the data signal on the frequency resources corresponding to the N first sub-bands. The channel reservation signal is a signal used to indicate the at least one first sub-band selected by the user equipment within the system bandwidth, and the data signal includes data information of the user equipment.

Optionally, if the signal sent by the transmitter 22 includes a channel reservation signal and a data signal, the transmitter 22 is specifically configured to, after the channel detection cycle ends, send the channel reservation signal on the frequency resources corresponding to the M first sub-bands; and after completion of sending the channel reservation signal, send the data signal on the frequency resources corresponding to the M first sub-bands. The channel reservation signal is a signal used to indicate the at least one first sub-band selected by the user equipment within the system bandwidth, and the data signal includes data information of the user equipment.

Optionally, the channel detection cycle includes at least one CCA timeslot, and that the processor 21 learns, by means of comparison, that the first interference strength is less than or equal to the first interference threshold includes: a first interference strength corresponding to each CCA timeslot within the channel detection cycle is less than or equal to the first interference threshold.

Optionally, the processor 21 is specifically configured to: select N first sub-bands from the system bandwidth according to a size of a to-be-sent data packet and the second interference strength on each sub-band within the system bandwidth; or select N first sub-bands from the system bandwidth according to a preset quantity of sub-bands occupied by each data packet and the second interference strength on each sub-band within the system bandwidth.

Optionally, the processor 21 is specifically configured to: select M first sub-bands from the system bandwidth according to a size of a to-be-sent data packet and the second interference strength on each sub-band within the system bandwidth; or select M first sub-bands from the system bandwidth according to a preset quantity of sub-bands occupied by each data packet and the second interference strength on each sub-band within the system bandwidth.

The user equipment provided in this embodiment is configured to execute the technical solutions in the method embodiments shown in FIG. 1 to FIG. 6. An implementation principle and a technical effect of the user equipment are similar to those in the method embodiment, and details are not described herein again.

In the entity embodiment of the user equipment, it should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor, or the like. The steps of the method disclosed with reference to the embodiments of the present invention may be directly performed and completed by a hardware processor, or may be performed and completed by using a combination of hardware and software modules in the processor.

Persons of ordinary skill in the art may understand that all or some of the steps of the method embodiments may be implemented by a program instructing relevant hardware. The program may be stored in a computer-readable storage medium. When the program is executed, the steps in the method embodiments are performed. The storage medium includes: a read-only memory (ROM), a RAM, a flash memory, a hard disk, a solid state disk, a magnetic tape, a floppy disk, an optical disc, and any combination thereof.

Finally, it should be noted that the foregoing embodiments are merely intended to describe the technical solutions in embodiments of the present invention, but not to limit embodiments of the present invention. Although embodiments of the present invention are described in detail with reference to the foregoing , persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:

determining, by user equipment, a channel detection cycle;

obtaining, by the user equipment within the channel detection cycle, a first interference strength within system bandwidth, and obtaining a second interference strength on each sub-band within the system bandwidth, wherein the first interference strength indicates a magnitude of an interference signal within the system bandwidth;

comparing, by the user equipment, the first interference strength with a first interference threshold; and when the first interference strength is less than or equal to the first interference threshold, selecting, by the user equipment, N first sub-bands from the system bandwidth according to the second interference strength on each sub-band within the system bandwidth, and sending a signal on frequency resources corresponding to the N first sub-bands, wherein N is a positive integer, and wherein a first sum of second interference strengths on the N first sub-bands is less than or equal to a second sum of second interference strengths on any N sub-bands other than the N first sub-bands within the system bandwidth.

2. The method according to claim 1, further comprising:

when the first interference strength is greater than the first interference threshold, waiting, by the user equipment, for a first duration of applying transmission resources to reach a preset maximum duration for applying transmission resources; and selecting, by the user equipment, M first sub-bands from the system bandwidth according to the second interference strength on each sub-band within the system bandwidth, and sending a signal on frequency resources corresponding to the M first sub-bands, wherein M is a positive integer, and wherein a third sum of second interference strengths on the M first sub-bands is less than or equal to a fourth sum of second interference strengths on any M sub-bands other than the M first sub-bands within the system bandwidth.

3. The method according to claim 1, wherein the second interference strength of each of the N first sub-bands is less than or equal to the second interference strength of any sub-band other than the N first sub-bands.

4. The method according to claim 2, wherein the second interference strength of each of the M first sub-bands is less than or equal to the second interference strength of any sub-band other than the M first sub-bands.

5. The method according to claim 1, wherein the signal sent by the user equipment comprises a channel reservation signal and/or a data signal, wherein the channel reservation signal is a signal indicates that the sub-band selected by the user equipment within the system bandwidth, and the data signal comprises data information of the user equipment.

6. The method according to claim 5, wherein the signal sent by the user equipment comprises a channel reservation signal and a data signal, and sending a signal on frequency resources corresponding to the N first sub-bands comprises:
   after the channel detection cycle ends, sending, by the user equipment, the channel reservation signal on the frequency resources corresponding to the N first sub-bands; and
   after completion of sending the channel reservation signal, sending, by the user equipment, the data signal on the frequency resources corresponding to the N first sub-bands.

7. The method according to claim 5, wherein the signal sent by the user equipment comprises a channel reservation signal and a data signal, and sending a signal on frequency resources corresponding to the M first sub-bands comprises:
   after the channel detection cycle ends, sending, by the user equipment, the channel reservation signal on the frequency resources corresponding to the M first sub-bands; and
   after completion of sending the channel reservation signal, sending, by the user equipment, the data signal on the frequency resources corresponding to the M first sub-bands.

8. The method according to claim 1, wherein the channel detection cycle comprises at least one channel assessment (CCA) timeslot, and that a first interference strength corresponding to each CCA timeslot within the channel detection cycle is less than or equal to the first interference threshold.

9. The method according to claim 1, wherein selecting, by the user equipment, N first sub-bands from the system bandwidth according to the second interference strength on each sub-band within the system bandwidth comprises:
   selecting, by the user equipment, N first sub-bands from the system bandwidth according to a size of a to-be-sent data packet and the second interference strength on each sub-band within the system bandwidth; or
   selecting, by the user equipment, N first sub-bands from the system bandwidth according to a preset quantity of sub-bands occupied by each data packet and the second interference strength on each sub-band within the system bandwidth.

10. The method according to claim 2, wherein the selecting, by the user equipment, M first sub-bands from the system bandwidth according to the second interference strength on each sub-band within the system bandwidth comprises:
   selecting, by the user equipment, M first sub-bands from the system bandwidth according to a size of a to-be-sent data packet and the second interference strength on each sub-band within the system bandwidth; or
   selecting, by the user equipment, M first sub-bands from the system bandwidth according to a preset quantity of sub-bands occupied by each data packet and the second interference strength on each sub-band within the system bandwidth.

11. User equipment, comprising:
   a processor configured to:
      determine a channel detection cycle;
      within the channel detection cycle, obtain a first interference strength within system bandwidth, and obtain a second interference strength on each sub-band within the system bandwidth, wherein the first interference strength is a sum of interference strengths on all sub-bands within the system bandwidth;
      compare the first interference strength with a first interference threshold, and
      when the first interference strength is less than or equal to the first interference threshold, select N first sub-bands from the system bandwidth according to the second interference strength on each sub-band within the system bandwidth, wherein N is a positive integer, wherein a first sum of second interference strengths on the N first sub-bands is less than or equal to a second sum of second interference strengths on any N sub-bands other than the N first sub-bands within the system bandwidth; and
   a transmitter configured to send a signal on frequency resources corresponding to the N first sub-bands.

12. The user equipment according to claim ii, wherein the processor is further configured to:
   when the first interference strength is greater than the first interference threshold, wait until a first duration of applying transmission resources reaches a preset maximum duration; and
   select M first sub-bands from the system bandwidth according to the second interference strength on each sub-band within the system bandwidth, and send a signal on frequency resources corresponding to the M first sub-bands, wherein M is a positive integer, wherein a third sum of second interference strengths on the M first sub-bands is less than or equal to a fourth sum of second interference strengths on any M sub-bands other than the M first sub-bands within the system bandwidth.

13. The user equipment according to claim ii, wherein the second interference strength of each of the N first sub-bands selected by the processor is less than or equal to the second interference strength on any sub-band other than the N first sub-bands.

14. The user equipment according to claim 12, wherein the second interference strength of each of the M first sub-bands selected by the processor is less than or equal to the second interference strength of any sub-band other than the M first sub-bands.

15. The user equipment according to claim ii, wherein the signal sent by the transmitter comprises a channel reservation signal and a data signal, and wherein the transmitter is configured to:
   after the channel detection cycle ends, send the channel reservation signal on the frequency resources corresponding to the N first sub-bands; and after completion of sending the channel reservation signal, send the data signal on the frequency resources corresponding to the N first sub-bands, wherein the channel reservation signal indicates that the at least one first sub-band selected by the user equipment within the system bandwidth, and the data signal comprises data information of the user equipment.

16. The user equipment according to claim 12, wherein the signal sent by the transmitter comprises a channel reservation signal and a data signal, and wherein the transmitter is configured to:
   after the channel detection cycle ends, send the channel reservation signal on the frequency resources corresponding to the M first sub-bands; and
   after completion of sending the channel reservation signal, send the data signal on the frequency resources corresponding to the M first sub-bands, wherein the channel reservation signal indicates that the at least one first sub-band selected by the user equipment within the system bandwidth, and the data signal comprises data information of the user equipment.

17. The user equipment according to claim ii, wherein the channel detection cycle comprises at least one channel assessment (CCA) timeslot, and that the processor is configured to determine that a first interference strength corresponding to each CCA timeslot within the channel detection cycle is less than or equal to the first interference threshold.

18. The user equipment according to claim ii, wherein the processor is configured to:
   select N first sub-bands from the system bandwidth according to a size of a to-be-sent data packet and the second interference strength on each sub-band within the system bandwidth; or
   select N first sub-bands from the system bandwidth according to a preset quantity of sub-bands occupied by each data packet and the second interference strength on each sub-band within the system bandwidth.

19. The user equipment according to claim 12, wherein the processor is configured to:
   select M first sub-bands from the system bandwidth according to a size of a to-be-sent data packet and the second interference strength on each sub-band within the system bandwidth; or
   select M first sub-bands from the system bandwidth according to a preset quantity of sub-bands occupied by each data packet and the second interference strength on each sub-band within the system bandwidth.

20. User equipment, comprising:
   an obtaining module, configured to determine a channel detection cycle;
   a detection module, configured to: within the channel detection cycle, obtain a first interference strength within system bandwidth, and obtain a second interference strength on each sub-band within the system bandwidth, wherein the first interference strength is a sum of interference strengths on all sub-bands within the system bandwidth;
   a processing module, configured to compare the first interference strength with a first interference threshold, determining that the first interference strength is less than or equal to the first interference threshold, wherein the processing module is further configured to select N first sub-bands from the system bandwidth according to the second interference strength on each sub-band within the system bandwidth, wherein N is a positive integer, and a first sum of second interference strengths on the N first sub-bands is less than or equal to a second sum of second interference strengths on any N sub-bands other than the N first sub-bands; and
   a sending module, configured to send a signal on frequency resources corresponding to the N first sub-bands.

* * * * *